(12) United States Patent
Yokoi et al.

(10) Patent No.: US 8,266,081 B2
(45) Date of Patent: Sep. 11, 2012

(54) PARAMETER CONTROLLING APPARATUS AND MULTISTAGE COLLATION APPARATUS

(75) Inventors: Hironori Yokoi, Kawasaki (JP); Toshio Endoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 528 days.

(21) Appl. No.: 12/570,007

(22) Filed: Sep. 30, 2009

(65) Prior Publication Data

US 2010/0088260 A1    Apr. 8, 2010

(30) Foreign Application Priority Data

Oct. 3, 2008 (JP) ................................ 2008-258944

(51) Int. Cl.
*G06N 5/00* (2006.01)
(52) U.S. Cl. .......................................... 706/14; 706/45
(58) Field of Classification Search .................... 706/14, 706/45
See application file for complete search history.

(56) References Cited

U.S. PATENT DOCUMENTS

| 7,161,468 B2 | 1/2007 | Hwang et al. |
| 2007/0237367 A1 | 10/2007 | Yamato et al. |
| 2008/0040614 A1 | 2/2008 | Abe |

FOREIGN PATENT DOCUMENTS

| JP | 2004-227589 A | 8/2004 |
| JP | 2006-059071 A | 3/2006 |
| JP | 2006-085268 A | 3/2006 |
| JP | 2007-213126 A | 8/2007 |

OTHER PUBLICATIONS

Heerwegh, Effects of Personal Salutations in E-Mail Invitations to Participate in a Web Survey, Public Opinion Quarterty. vol. 69, No. 4, Winter 2005, pp. 588-598.*

* cited by examiner

*Primary Examiner* — Wilbert L Starks
(74) *Attorney, Agent, or Firm* — Fujitsu Patent Center (57) ABSTRACT

A parameter controlling apparatus calculates similarity variation distribution of different data and that of identical data. The parameter controlling apparatus creates a collation break-off rate function and an error probability function based on the similarity variation distribution of the different data and that of the identical data, respectively, and creates a total collation time function and a total error probability function based on the collation break-off rate function and the error probability function. The parameter controlling apparatus creates a constraint equation based on the total collation time function, the total error probability function, total collation time constraint parameters, and total error probability constraint parameters. The parameter controlling apparatus calculates a parameter group that optimizes an objective function constituted by the collation break-off rate function, the error probability function, the total collation time function, and the total error probability function among combinations of parameters that satisfy the constraint equation.

15 Claims, 7 Drawing Sheets

PARAMETER CONTROLLING APPARATUS AND MULTISTAGE COLLATION APPARATUS

CROSS-REFERENCE TO RELATED APPLICATION(S)

This application is based upon and claims the benefit of priority of the prior Japanese Patent Application No. 2008-258944, filed on Oct. 3, 2008, the entire contents of which are incorporated herein by reference.

FIELD

The embodiment discussed herein is directed to a parameter controlling apparatus that controls parameters for adjusting precision and speed of refining registration data in collation processing and a multistage collation apparatus that collates input data with registered data at multiple stages.

BACKGROUND

In recent years, systems have been increasingly used that use biometric authentication, for example, in identity verification in withdrawing cash from an automatic teller machine (ATM), in individual identification at a security gate, and the like. The biometric authentication authenticates a person when input data, such as physical features including a fingerprint and a palm vein which are different from person to person, matches physical features registered in advance as data. Since the fingerprint, the palm vein pattern, and the like especially differ from person to person, a biometric authentication system in which advanced security is ensured through the biometric authentication is utilized by taking advantage of the fact that an appropriate use of a sensor and a computer enables automatic, highly precise, and valid identification.

In the authentication system described above, there are cases where registration data like ID as a collation target is not specified (or cannot be specified) because of convenience and the like of a user in collating each input data with a plurality of pieces of registration data in an authentication system and the like at a gate to be used by a number of registered users. In this case, collation between the input data and all pieces of registered data is needed and considerable time is required depending on the number of pieces of the registered data. However, it is only a small part of data that needs to be collated in detail and with precision in general, and majority of data can be eliminated in rough and high-speed collation processing. Based on this, multistage collation is generally performed in such a manner that the collation processing is divided into multiple stages, a rough and high-speed collating unit is used for refining data, and another collating unit which, although having precision, takes a long time for one collation is used for verifying the rest minority of data. An apparatus which performs the multistage collation is referred to as multistage collation apparatus.

In collation processing at each stage in the multistage collation, a precision and an amount (ratio) of data elimination at each stage are generally set and adjusted by parameters (a set of parameters) which are called as a threshold value with respect to a degree of similarity. When a threshold value at a stage is low, a possibility of mistakenly eliminating valid data is lowered in exchange for the fact that a refinement at the stage is lax, a ratio of registration data to proceed to a subsequent stage increases, and thereby a time for the processing in the subsequent stage increases. On the other hand, when the threshold value is set high, the possibility of mistakenly eliminating valid data increases in exchange for the fact that the refinement is performed severely, the ratio of registration data to proceed to the subsequent stage becomes small, and thereby the time for the processing in the subsequent stage becomes short. Thus, the threshold value needs to be adjusted precisely enough not to be too low and too high depending on a system to be used. Although the threshold value has generally been adjusted manually, since the adjustment operation requires time and cost including labor cost and the like, it is difficult to manually adjust the threshold value after the operation starts. Therefore, the parameters are generally adjusted before the operation and not changed during the operation.

However, since registration data is additionally registered momentarily, both the time and the precision of the collation momentarily change depending on a change in the number of pieces of registration data and a property of the registration data (how much amount of similar data is present and the like, for example) even during the operation of the multistage collation apparatus. Nevertheless, any breakdowns in the system including a failure in security maintenance, a prolonged collation, and the like are unacceptable.

Therefore, in the threshold adjustment, the threshold value is generally adjusted and fixed during the operation so that the collation processing is completed in a certain time period even in the worst case and the collation precision above a certain level can be obtained in accordance with assumed longest collation time and worst collation precision. On this occasion, the adjustment is performed with an assumption of a case where there are numerous pieces of similar data and a ratio of data to be collated at a subsequent stage at a lower speed and with a higher precision is heightened. Specifically, a method of: controlling an upper limit of the number of pieces of data to be registered so that the collation is completed in a certain time period even in the case where the collation takes time in proportion to the number of pieces of data (worst case); besides performing an adjustment in which a data elimination is not so actively performed at a previous stage for collation to be performed at a subsequent collation so that the precision is above a certain level (an error collation in which different pieces of data are regarded as being identical is below a certain level) when there are numerous pieces of similar data with the maximum registration data; and the like is adopted.

However, since the threshold value is fixed in accordance with the worst case in the threshold adjustment as described above, primary performance, which can be realized when an optimum threshold value is used, of the collation system cannot be obtained with respect to the number of pieces of registration data, registration data properties, and the like at each time point in the operation of the multistage collation apparatus, and thereby the system is operated with relatively low collation precision, at relatively low collation processing speed, and the like.

In view of this, as a unit for automatically adjusting a threshold value for collation at any given time, Japanese Laid-open Patent Publication No. 2006-59071 discloses a conventional technology in which, for example, a threshold value that draws a correspondence between a first value and a second value is calculated to perform biometric authentication based on this threshold value. The first value is obtained by dividing an absolute value of a difference between a threshold value associated with a living body and an average value of a plurality of first correlation values generated by detecting a correlation of a plurality of pieces of first characteristic data obtained in advance from the living body with data for collation, by a standard deviation of the plurality of first correlation values. The second value is obtained by dividing an absolute value of a difference between the threshold value and an average value of a plurality of second correlation values generated by detecting a correlation of a plurality of pieces of second characteristic data obtained in advance from another living body with the data for collation, by the plurality of second correlation values.

Japanese Laid-open Patent Publication No. 2007-213126 discloses another conventional technology related to individual collation. With the conventional technology, for example, first living body information is obtained from an individual as a target for individual collation. Then, second living body information and collation information indicating accumulated collation results in the past with respect to the second living body information are stored. A threshold value to be used for collation judgment is determined based on the collation information. A degree of similarity between the first living body information and the second living body information is compared with the determined threshold value for judgment.

Japanese Laid-open Patent Publication No. 2006-85268 has proposed still another conventional technology for effective multistage collation. With the conventional technology, for example, in a case with a degree of similarity apparently determined to be authentication failure among cases with various degrees determined to be authentication failure in the first collation, by controlling to perform only the second collation not to perform ineffectual collation processing or by updating registration data in the first collation with registration data in the second collation in a biometric authentication system of a multistage collation method.

Japanese Laid-open Patent Publication No. 2004-227589 has proposed still another conventional technology in which authentication is performed based on a combination of biometric authentication and a password. With the conventional technology, a threshold value to be used in biometric authentication is set to a first threshold value that lowers a false rejection rate (FRR), i.e., a probability of mistakenly rejecting a person as others, when an input password matches a registered password. Meanwhile, the threshold value to be used in the biometric authentication is set to a second threshold value that lowers a false acceptance rate (FAR), i.e., a probability of mistakenly accepting others as the person, when the input password does not match the registered password.

However, according to the conventional technologies described above, it is difficult to balance the collation precision and the collation processing speed in the collation processing between input living body information and registered living body information since an individual piece of living body information has a large amount of data and the number of registration is huge. It is also difficult to ensure the collation processing speed when priority is placed on the collation precision, and difficult to ensure security and the collation precision when priority is placed on the collation processing speed. Further, a user is required to input additional information including the password and the like, which reduces the convenience of the user.

SUMMARY

According to an aspect of an embodiment, a parameter controlling apparatus controls parameters for adjusting, in a multistage collation apparatus that collates between input data and multiple pieces of registration data at multiple stages with multiple collating devices, refinement precision of the registration data. The parameter controlling apparatus includes an inter-different-data-similarity-variation-distribution calculator, an identical-data-similarity-variation-distribution calculator, a collation break-off rate function creator, an error probability function creator, a total collation time function/total error probability function creator, a constraint equation creator, and an optimum parameter calculator. The inter-different-data-similarity-variation-distribution calculator calculates distribution of similarity variation of different pieces of data as distribution of occurrence probability of similarity of different pieces of the registration data in the collating devices at multiple stages. The identical-data-similarity-variation-distribution calculator calculates distribution of similarity variation in identical data as distribution of occurrence probability of similarity in identical data for each of the input data. The collation break-off rate function creator creates a collation break-off rate function in which the parameters are variables in the collating devices at multiple stages based on the distribution of similarity variation of the different pieces of data calculated by the inter-different-data-similarity-variation-distribution calculator. The error probability function creator creates an error probability function in which the parameters are variables in the collating devices at multiple stages based on the distribution of similarity variation in the identical data calculated by the identical-data-similarity-variation-distribution calculator. The total collation time function/total error probability function creator creates a total collation time function and a total error probability function based on the collation break-off rate function, the error probability function, number of pieces of the registration data, and unit collation time information in the collating devices at multiple stages. The constraint equation creator creates a constraint equation based on the total collation time function, the total error probability function, total collation time constraint parameters corresponding to the total collation time function, and total error probability constraint parameters corresponding to the total error probability function. The optimum parameter calculator calculates an optimum parameter group which is a combination of parameters that optimizes an objective function constituted by the collation break-off rate function, the error probability function, the total collation time function, and the total error probability function among combinations of parameters that satisfy the constraint equation created by the constraint equation creator.

According to another aspect of an embodiment, a computer readable storage medium stores instructions that, when executed by a computer, causes the computer to perform the above parameter control.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Exemplary embodiments of the invention will be explained with reference to the accompanying drawings. In the embodiment described below, a multistage collation apparatus includes collating devices specific to multiple collation stages, respectively. Although those that specify a rejection level of each piece of registration data, i.e., adjust a ratio and precision of refinement of the registration data, in the collating device at each collation stage are generally called "thresholds", they are referred to as "parameters" in the embodiment. Besides, the term "registration data" as used herein refers to information, such as living body measurement data of a collation target, registered in the multistage collation apparatus in advance. The term "input data" as used herein refers to information, such as living body information, input upon authentication. It should be noted that registration data and input data are not limited to living body information.

First, a parameter controlling apparatus, a program that implements the parameter controlling apparatus (hereinafter, "parameter controlling program"), and the multistage collation apparatus according to the embodiment will be explained with reference to FIG. 1. The parameter controlling apparatus, the parameter controlling program, and the multistage collation apparatus perform collation between one input datum (hereinafter, "input data") and multiple pieces of registration data and perform a one-to-many collation in which any of the registration data to match the input data is extracted in collation processing in a biometric authentication. On this occasion, the collation processing is sequentially performed through divided multiple collation stages as illustrated in FIG. 1 to perform a high-speed collation.

Figure 1:
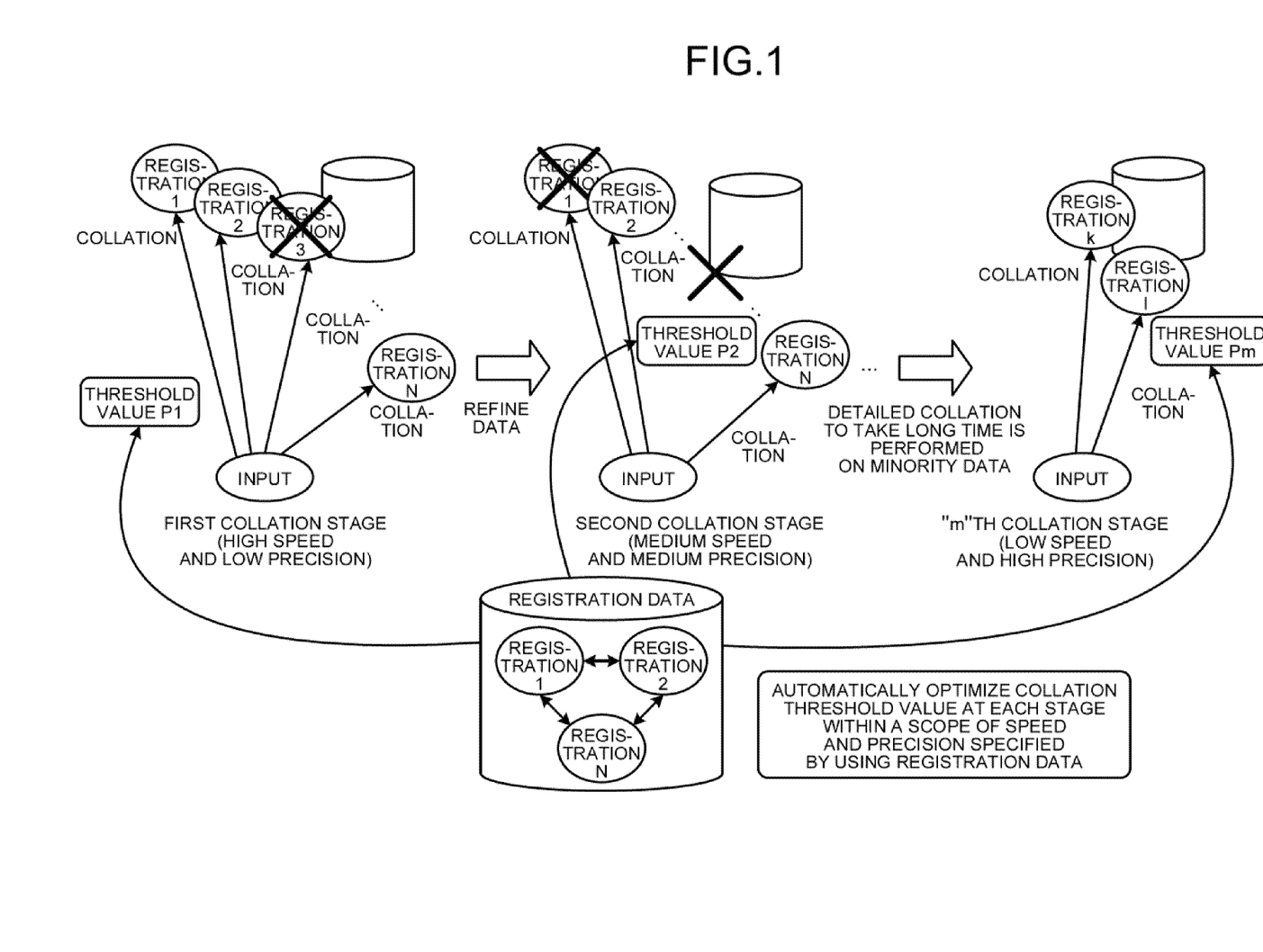
FIG. 1 is an example schematic diagram for explaining a parameter controlling apparatus and a multistage collation apparatus according to an embodiment.

For example as illustrated in FIG. 1, registration data is refined through collation processing at high speed and with low precision at a first collation stage. Next, the registration data is refined further from the first collation stage through collation processing at medium speed and with medium precision at a second collation stage. After that, collation processing is similarly and sequentially performed in a subsequent stage at lower speed and with higher precision than the previous stage.

Then, collation processing at lowest speed and with highest precision is performed with respect to a minority of the registration data as a result of the refinement in the previous multiple collation processes at the last "m"th collation stage, and one piece of the registration data which has a high possibility of being most identical to the input data is specified and further verified. Parameters for adjusting a refinement precision of the registration data at multiple collation stages are automatically calculated as a threshold value set so that at least one of the collation speed and the collation precision becomes optimum according to the registration data. In this manner, a high-speed collation processing can be performed while ensuring advanced security and collation precision. It should be noted that the number of collation stages is arbitrarily determined.

Next, a brief overview of deriving, from registration data, a relationship of parameters, a collation break-off rate, and an error probability at each collation stage will be explained with reference to FIG. 2. For a calculation of a combination of parameters, a distribution of similarity variation of different pieces of data (hereinafter, "inter-different-data-similarity-variation distribution") and a distribution of similarity variation in identical data (hereinafter, "identical-data-similarity-variation distribution") in the registration data need to be calculated at each collation stage in advance.

Figure 3A:
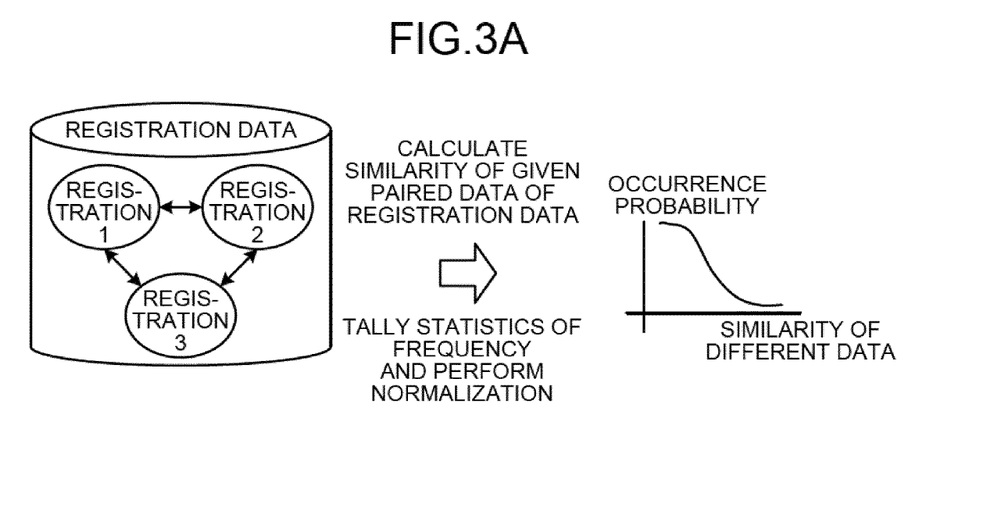
FIG. 3A is an example schematic diagram for explaining how to calculate distribution of similarity variation in different data.

Specifically, the inter-different-data-similarity-variation distribution is calculated in the following manner, as illustrated in FIG. 3A. First, a similarity calculator is used to calculate a similarity of different pieces of data at each collation stage with respect to given paired data. For the similarity calculator, a known technology (a collating device at each stage and the like) is used. Then, the calculated similarity of different pieces of data at each collation stage is tallied for each collation stage, a statistical distribution of an occurrence frequency of the similarity is obtained and normalized, and thereby an occurrence probability distribution for each similarity of different pieces of data (probability distribution of the similarity of different pieces of data) at each collation stage is obtained.

Figure 3B:
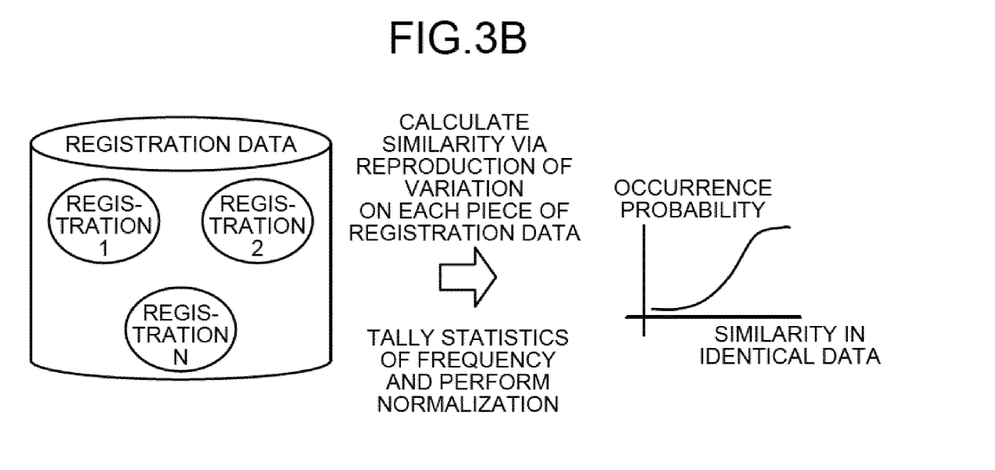
FIG. 3B is an example schematic diagram for explaining how to calculate distribution of similarity variation in identical data.

In addition, the identical-data-similarity-variation distribution is calculated in the following manner, as illustrated in FIG. 3B. First, a variation, an error, and the like, which are generated on entry, of data are reproduced with respect to each piece of the registration data. In the case of the biometric authentication for example, a region shape, a variation of a posture and the like, a noise generated in a measurement device, an disturbance signal due to a peripheral environmental condition and the like, and the like as a factor of the variation, error, and the like, are reproduced by appropriately applying various existing technologies such as a physical calculation model according to each registration data type and each system structure, and a simulating technology using the physical calculation model. The similarity of identical data at each collation stage is tallied by adding the reproduced variation, error, and the like, a statistical distribution of an occurrence frequency of the similarity is obtained and normalized, and thereby an occurrence probability distribution for each similarity in identical data (probability distribution of the similarity in identical data) is obtained.

Figure 4A:
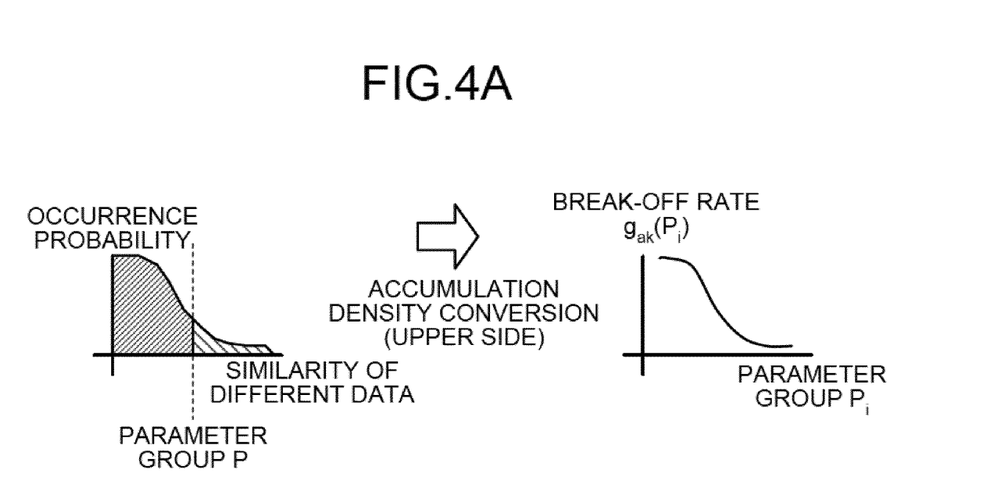
FIG. 4A is an example schematic diagram (A) for explaining how to derive a correspondence function of parameters, a collation break-off rate, and an error probability at each collation stage.
Figure 4B:
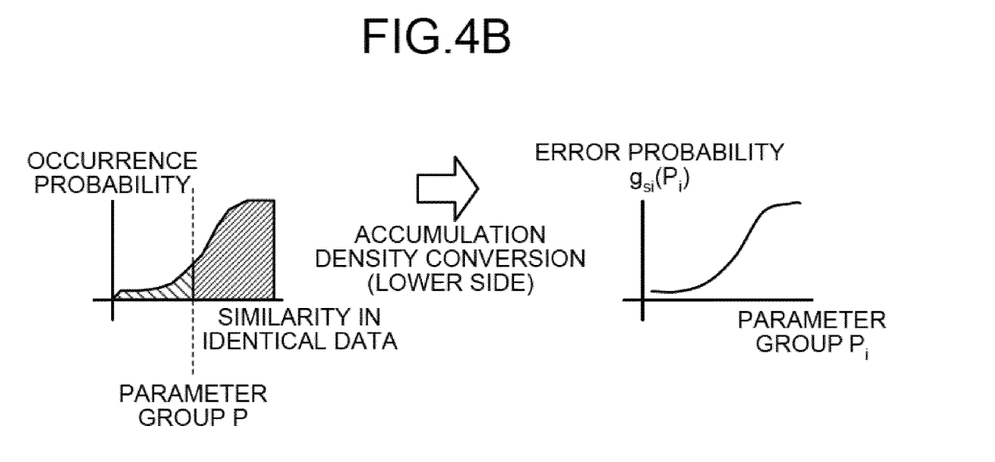
FIG. 4B is an example schematic diagram (B) for explaining how to derive a correspondence function of parameters, a collation break-off rate, and an error probability at each collation stage.

Next, as illustrated in FIG. 4A, the inter-different-data-similarity-variation distribution is obtained by performing an accumulation density conversion of the probability distribution of the similarity of different pieces of data to an upper side (by obtaining, with respect to each parameter "P", a summation of an occurrence probability equal to or more than "P", i.e., an accumulation value as illustrated at the left side in FIG. 4A). Besides, as illustrated in FIG. 4B, the identical-data-similarity-variation distribution is obtained by performing an accumulation density conversion of the probability distribution of the similarity in identical data to a lower side (by obtaining, with respect to each parameter "P", a summation of an occurrence probability equal to or less than "P", i.e., an accumulation value as illustrated at the left side in FIG. 4B).

At an "i"th collation stage, a ratio of different pieces of data whose similarity is equal to or more than the parameter "P" is defined as a collation break-off rate function (a ratio of registration data which is judged to be different data at each collation stage and eliminated from a subsequent collation stage) $g_{ai}(P)$, which is a function in which the parameter "P" is a variable. The collation break-off rate function is equivalent to the inter-different-data-similarity-variation distribution. The collation break-off rate function $g_{ai}(P)$ is hereinafter identified as the inter-different-data-similarity-variation distribution. Besides, a ratio of identical data whose similarity is equal to or less than the parameter "P" is defined as an error probability function (probability of judging input data mistakenly as different registration data) $g_{si}(P)$, which is a function in which the parameter "P" is a variable, at the "i"th collation stage. Similarly, the error probability function is equivalent to the identical-data-similarity-variation distribution. The error probability function $g_{si}(P)$ is hereinafter identified as the identical-data-similarity-variation distribution.

Here, the collation break-off rate function $g_{ai}(P)$ is a monotonically decreasing function and the error probability function $g_{si}(P)$ is a monotonically increasing function. This is because each of the collation break-off rate and the error probability becomes a monotonic function due to a property of the accumulation density conversion. Though the collation break-off rate function $g_{ai}(P)$ and the error probability function $g_{si}(P)$ can be expressed in various manners by being modified and approximated via various types of well-known general-purpose functions such as an interpolation equation, an accumulation density function, and the like, it is apparent that any expression can be arbitrarily configured within a scope in which differences of those expressions do not depart from a gist of the invention, i.e., expressing a distribution of data variation and the like as an essence of the collation break-off rate function and the error probability function. Such different configurations are hereinafter represented by and referred to as the collation break-off rate function and the error probability function.

Figure 2:
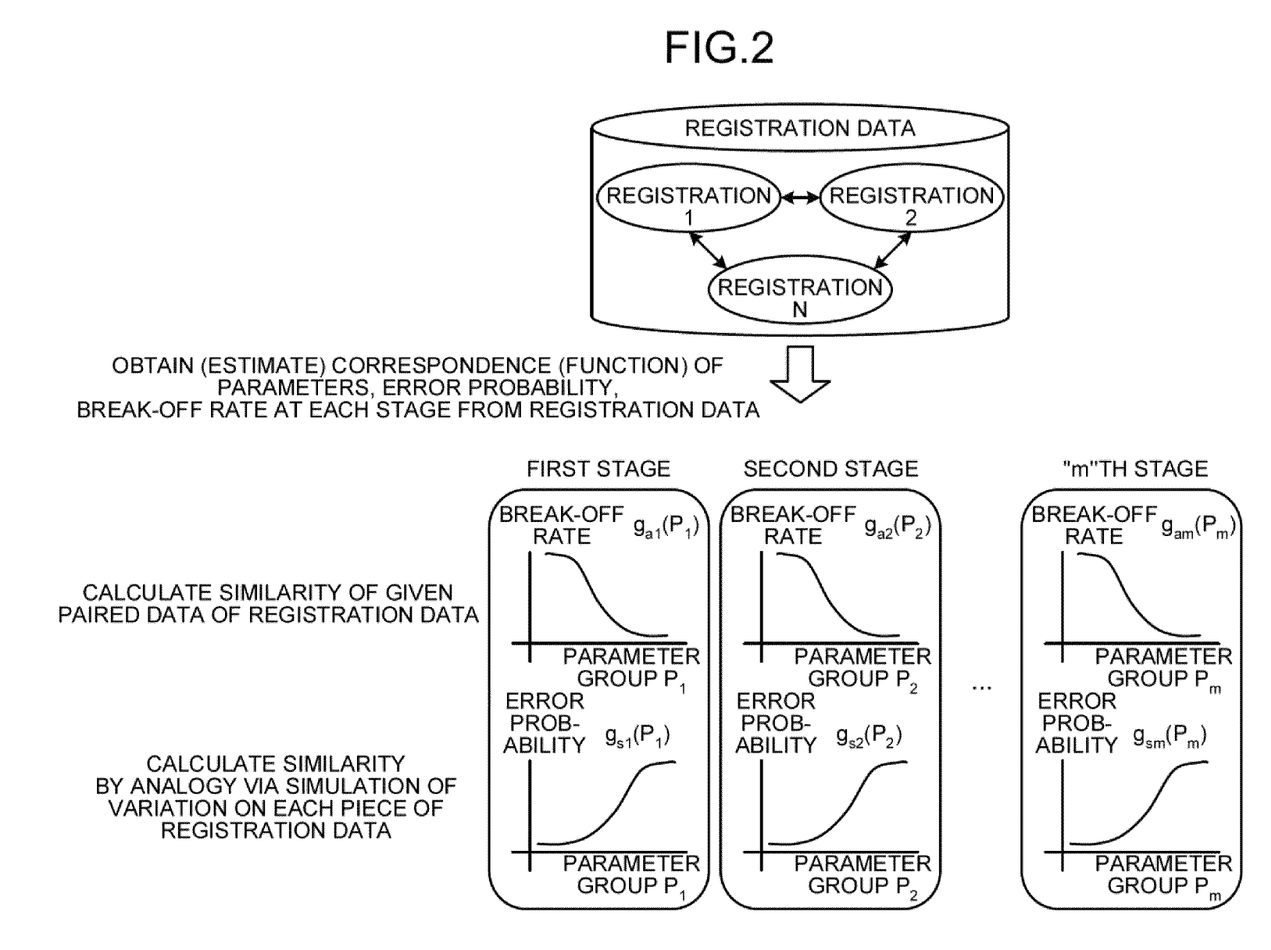
FIG. 2 is an example schematic diagram for explaining how to derive, from registration data, a relationship of parameters, a collation break-off rate, and an error probability at each collation stage.

In this manner, the collation break-off rate function $g_{ai}(P)$ and the error probability function $g_{si}(P)$ at the "i"th collation stage are respectively obtained from the registration data as illustrated in FIG. 2.

Next, a function of a total collation time and a function of a total error probability in the multistage collation apparatus are derived from the correspondence function group, the number of pieces of registration data, and a collation time required for one collation at each collation stage (hereinafter, "unit collation time"). Then, an optimization problem which is formed by a constraint equation and an objective function constituted by the derived functions is solved by a numeric calculation.

The unit collation time can be assumed approximately as a constant value in a majority of collation methods. When a variation is present, the unit collation time, if expressed as a probability variable or an interval value, can be applied easily to the configuration and the parameter controlling processing of the parameter controlling apparatus and the multistage collation apparatus according to the embodiment. Here, a collation test is performed with respect to the registration data and a value momentarily updated from the time when the collation test is performed may be treated as the unit collation time.

Here, the objective function is defined by the following expression as "T" (total collation time) and "G" (total error probability). In expression (1.1) below, "N" indicates the number of pieces of registration data, "$C_i$" indicates a time required for one collation processing at the "i"th collation stage, "$P_i$" indicates parameters which control a refinement precision of registration data at the "i"th collation stage, and "$g_{ai}(P)$" indicates the collation break-off rate function, in which "$P_i$" is a variable, at the "i"th collation stage as described above. Besides, in expression (1.2) below, "$g_{si}(P_i)$" indicates the error probability function, in which "$P_i$" is a variable, at the "i"th collation stage as described above.

Total collation processing time:

$$T := N(C_1 + (1-g_{a1}(P_1))(C_2 + (1-g_{a2}(P_2))(C_3 + (1-g_{a3}(P_3))(\ldots(C_m + (1-g_{am}(P_m)))))))\quad(1.1)$$

Total error probability:

$$G := 1 - \prod_{i=1}^{m}(1 - g_{si}(P_i))\quad(1.2)$$

Then, the optimization problem described above can be provided by the following expression. Here in expression (2.1) below, "T" indicates the total collation time defined in expression (1.1) above, "G" indicates the total error probability defined in expression (1.2) above, "$T_{const}$" indicates a desired designated value of the total collation time, and "$G_{const}$" indicates a desired designated value of the total error probability (which is synonymous with a designated value of the collation precision).

$$\min_{\{P_i\}} T \text{ s.t. } G \leq G_{const}\quad(2.1)$$

$$\min_{\{P_i\}} G \text{ s.t. } T \leq T_{const}\quad(2.2)$$

By solving the optimization problem provided by at least one of expressions (2.1) and (2.2) above, at least one of a parameter group $P_i$ which achieves the shortest processing time under a constraint of the collation precision (total error probability) and a parameter group $P_i$ which provides an optimum precision (minimum total error probability) under a constraint of the collation time is obtained, and the collation processing is automatically optimized at each collation stage by using the obtained parameter group $P_i$.

In other words, in expression (2.1) above, a minimum value for "T" and a combination of "$P_i$" (optimum parameter group) when "T" is the minimum value are obtained based on the constraint equation of the collation precision (total error probability) of "$G \leq G_{const}$" by scanning the parameter $P_i$. Besides, in expression (2.2) above, a minimum value for "G" and a combination of "$P_i$" (optimum parameter group) when "G" is the minimum value are obtained based on the constraint equation of the total collation time of "$T \leq T_{const}$" by scanning the parameter $P_i$.

Next, a structure of the multistage collation apparatus according to the embodiment will be explained with reference to FIG. 5. A multistage collation apparatus 100 according to the embodiment includes a multistage collator 101, a registration data database (DB) 102, an inter-different-data-similarity-variation-distribution calculator 103, an identical-data-similarity-variation-distribution calculator 104, an on-entry variation reproducing unit 105, a mathematical expression creator 106, an optimum parameter group calculator 107, a constraint condition relaxing unit 108, and an external outputting unit 109.

Figure 5:
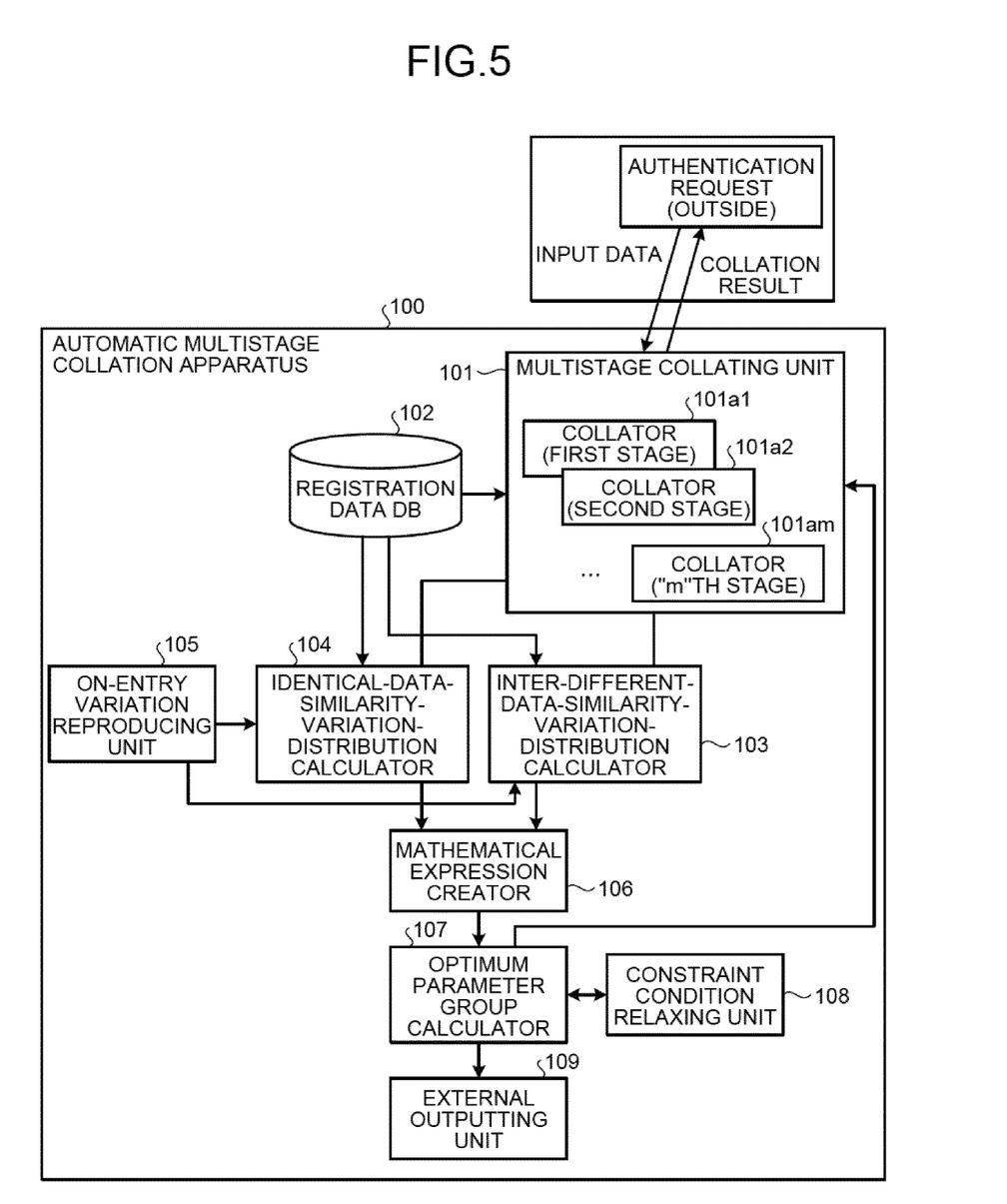
FIG. 5 is an example functional block diagram of the multistage collation apparatus according to the embodiment.

The multistage collator 101 has a collating unit (1st stage) 101a1, a collating unit (2nd stage) 101a2, (collating units for 3rd to "m−1"th stages are not illustrated in FIG. 5), and a collating unit ("m"th stage) 101am. The multistage collator 101 performs, in response to an authentication request upon an entry of data input from the outside, collation processing between the input data and registration data registered in the registration data DB 102 in an order of the collating unit (1st stage) 101a1, the collating unit (2nd stage) 101a2, (the collating units for 3rd to "m−1"th stages are not illustrated in FIG. 5), and the collating unit ("m"th stage) 101am. Each collating unit ("i"th stage) uses a parameter group $P_i$ which is calculated in advance by the optimum parameter group calculator 107 and corresponds to each collating unit ("i"th stage) in the collation processing.

The registration data DB 102 stores registration data such as living body information which is input in advance. The inter-different-data-similarity-variation-distribution calculator 103, in such a manner as already described with reference to FIGS. 3A and 4A, calculates a distribution of a similarity variation of different pieces of registration data (the inter-different-data-similarity-variation distribution and the collation break-off rate function $g_{ai}(P)$) registered in the registration data DB 102.

Here, without limiting to different pieces of registration data registered in the registration data DB 102, the inter-different-data-similarity-variation-distribution calculator 103 may include similar data used in other similar systems to calculate the distribution of the similarity variation of different pieces of data (the inter-different-data-similarity-variation distribution and the collation break-off rate function $g_{ai}(P)$). Through this manner, the precision of the distribution of the similarity variation of different pieces of registration data (the inter-different-data-similarity-variation distribution and the collation break-off rate function $g_{ai}(P)$) can further be enhanced.

Besides, the identical-data-similarity-variation-distribution calculator 104, in such a manner as already described with reference to FIGS. 3B and 4B, calculates a distribution of a similarity of each piece of the registration data registered in the registration data DB 102 (the identical-data-similarity-variation distribution and the error probability function $g_{si}(P)$).

Here, without limiting to registration data registered in the registration data DB 102, the identical-data-similarity-variation-distribution calculator 104 may include similar data used in other similar systems to calculate the distribution of the similarity of each piece of the registration data (the identical-data-similarity-variation distribution and the error probability function $g_{si}(P)$). Through this manner, the precision of the distribution of the similarity of each piece of the registration data (the identical-data-similarity-variation distribution and the error probability function $g_{si}(P)$) can further be enhanced.

The on-entry variation reproducing unit 105 reproduces a variation, an error, and the like, which are generated upon an entry similarly to the registration of the registration data, of input data. For example in the case of the biometric authentication, a region shape, a variation of a posture and the like, a noise generated in a measurement device, an disturbance signal due to a peripheral environmental condition and the like, and the like can be the factors of the variation, the error, and the like. The on-entry variation reproducing unit 105 transfers the reproduced variation, error, and the like of the input data to at least one of the inter-different-data-similarity-variation-distribution calculator 103 and the identical-data-similarity-variation-distribution calculator 104.

The inter-different-data-similarity-variation-distribution calculator 103 and the identical-data-similarity-variation-distribution calculator 104 add the variation, error, and the like of the input data reproduced by the on-entry variation reproducing unit 105 to calculate the inter-different-data-similarity-variation distribution (the collation break-off rate function $g_{ai}(P)$) and the identical-data-similarity-variation distribution (the error probability function $g_{si}(P)$), respectively.

The mathematical expression creator 106 calculates the total collation time T in expression (1.1) above and the total error probability G in expression (1.2) above based on the inter-different-data-similarity-variation distribution (the collation break-off rate function $g_{ai}(P)$) calculated by the inter-different-data-similarity-variation-distribution calculator 103 and the identical-data-similarity-variation distribution (the error probability function $g_{si}(P)$) calculated by the identical-data-similarity-variation-distribution calculator 104.

Besides, the mathematical expression creator 106 creates the optimization problem provided by at least one of expressions (2.1) and (2.2) described above based on information of the designated value of the total collation time $T_{const}$, the designated value of the total error probability $G_{const}$, and the unit collation time which are input as constraint conditions. It should be noted that expressions (2.1) and (2.2) are only an example of a constraint equation and an objective function, and the invention is not limited to the case of the expressions. Any structural modification including a usage of an objective function and a constraint in which the total processing time function and the total error probability are mixed, and the like can be made. A typical example in the cases (2.1) and (2.2) will be disclosed below.

The optimum parameter group calculator 107 obtains, through a numeric analysis, a solution of the optimization problem provided by at least one of expressions (2.1) and (2.2) created by the mathematical expression creator 106. In other words, a minimum value for "T" and a combination of "$P_i$" (optimum parameter group) when "T" is the minimum value are obtained based on the constraint equation "$G \leq G_{const}$" by scanning the parameter $P_i$ in expression (2.1) as described above. Besides, a minimum value for "G" and a combination of "$P_i$" (optimum parameter group) when "G" is the minimum value are obtained based on the constraint equation "$T \leq T_{const}$" by scanning the parameter $P_i$ in expression (2.2).

When the solution of the optimization problem is obtained, the optimum parameter group calculator 107 then outputs, to the external outputting unit 109, the obtained solution and the fact that the solution is obtained without relaxing the constraint condition. The external outputting unit 109 is, for example, a display device; an authentication system of every kind, such as a controller of an entrance/exit gate and a controller in an automatic teller machine, which performs a switching and the like of operations in response to a state of the parameter calculation; and the like.

On the other hand, when the solution of the optimization problem is not obtained, including a case where the solution is not present or a case where the calculation of the solution is difficult because of an extremely low possibility of the presence of the solution, the optimum parameter group calculator 107 requests the constraint condition relaxing unit 108 to relax the constraint conditions. In response to the request to relax the constraint condition from the optimum parameter group calculator 107, the constraint condition relaxing unit 108 transfers, to the optimum parameter group calculator 107, minimum relaxed constraint conditions which have a possibility of allowing obtaining the solution of the optimization problem from (a scope of) relaxed constraint conditions input in advance. The optimum parameter group calculator 107 again solves the optimization problem under the relaxed constraint conditions.

The optimum parameter group calculator 107 receives the relaxed constraint conditions which gradually relax the constraint conditions from the constraint condition relaxing unit 108 until the solution of the optimization problem (optimum parameter group $P_i$) is obtained, and again solves the optimization problem under the corresponding relaxed constraint conditions. However, when the solution of the optimization problem can not be obtained even on reception of maximum relaxed constraint conditions from the constraint condition relaxing unit 108, the optimum parameter group calculator 107 ends the processing with a conclusion that no solution is present and outputs the conclusion to the external outputting unit 109.

When the solution of the optimization problem (optimum parameter group $P_i$) is obtained, the optimum parameter group calculator 107 then transfers the optimum parameter group $P_i$ to each collating unit ("i"th stage) 101ai ("i"=1, 2, ... m).

Figure 6:
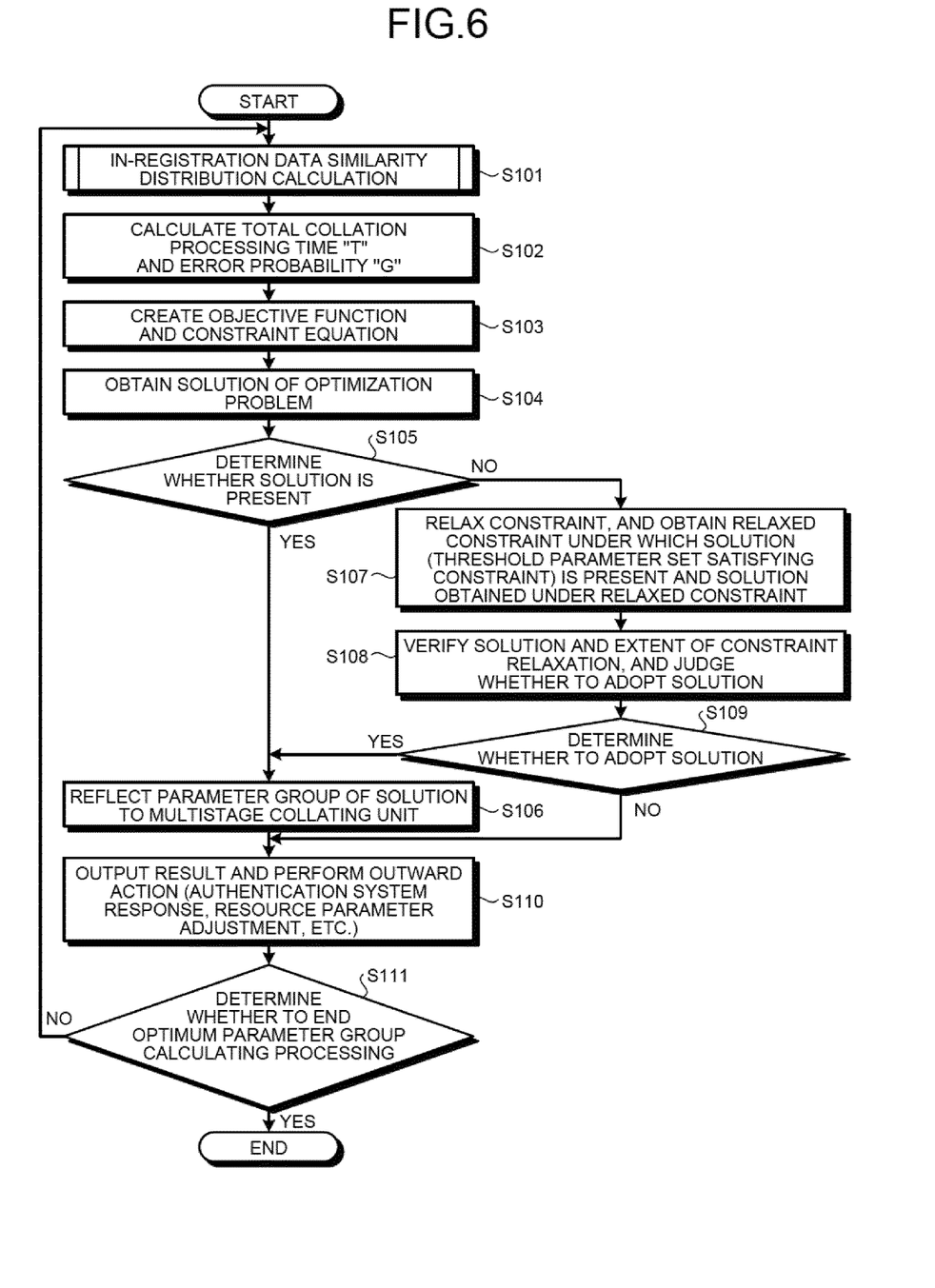
FIG. 6 is an example flowchart of the process of calculating an optimum parameter group.

Next, optimum parameter group calculating processing performed by the multistage collation apparatus according to the embodiment will be explained with reference to FIG. 6. First, the inter-different-data-similarity-variation-distribution calculator 103 and the identical-data-similarity-variation-distribution calculator 104 calculate similarity distribution in registration data, i.e., perform in-registration data similarity distribution calculation (step S101). A detail of the in-registration data similarity distribution calculation will be described later with reference to FIG. 7.

Next, the mathematical expression creator 106 calculates the total collation time T defined by expression (1.1) described above and the total error probability G defined by expression (1.2) described above (step S102). Then, the mathematical expression creator 106 creates an objective function and a constraint equation included in at least one of expressions (2.1) and (2.2) described above to create an optimization problem (step S103).

Next, the optimum parameter group calculator 107 carries out solving the optimization problem (obtaining the optimum parameter group $P_i$) expressed by at least one of above expressions (2.1) and (2.2) created by the mathematical expression creator 106 via a numeric calculation and the like (step S104).

Then, the optimum parameter group calculator 107 judges whether the solution of the optimization problem is present (step S105). When the solution of the optimization problem is judged to be present (Yes at step S105), the optimum parameter group calculator 107 proceeds to step S106, and when the solution of the optimization problem is judged not to be present (No at step S105), the optimum parameter group calculator 107 proceeds to step S107.

At step S106, the optimum parameter group calculator 107 reflects the parameter group of the solution of the optimization problem to the multistage collator 101. When step S106 ends, the optimum parameter group calculator 107 proceeds to step S110.

Meanwhile, the optimum parameter group calculator 107 carries out solving the optimization problem under the constraint conditions relaxed by the constraint condition relaxing unit 108 at step S107. Then, the optimum parameter group calculator 107 performs a verification of the obtained solution and the extent of the relaxed constraint conditions to judge whether to adopt the obtained solution (step S109).

Next, when the solution obtained at step S108 is judged to be adoptable (Yes at step S109), the optimum parameter group calculator 107 proceeds to step S106, and when the solution obtained at step S108 is judged not to be adoptable (No at step S109), the optimum parameter group calculator 107 proceeds to step S110.

At step S110, the optimum parameter group calculator 107 controls the external outputting unit 109 to output a system response to the authentication request, the solution result of the optimization problem, an outward action such as at least one of a resource adjustment instruction and a parameter adjustment instruction according to the solution result of the optimization problem, to the outside. Then, the control unit, though not illustrated, of the multistage collation apparatus judges whether to end the optimum parameter group calculating processing (step S111), ends the optimum parameter group calculating processing when the processing is judged to be ended (Yes at step S111), and proceeds to step S101 when the processing is judged not to be ended (No at step S111).

Figure 7:
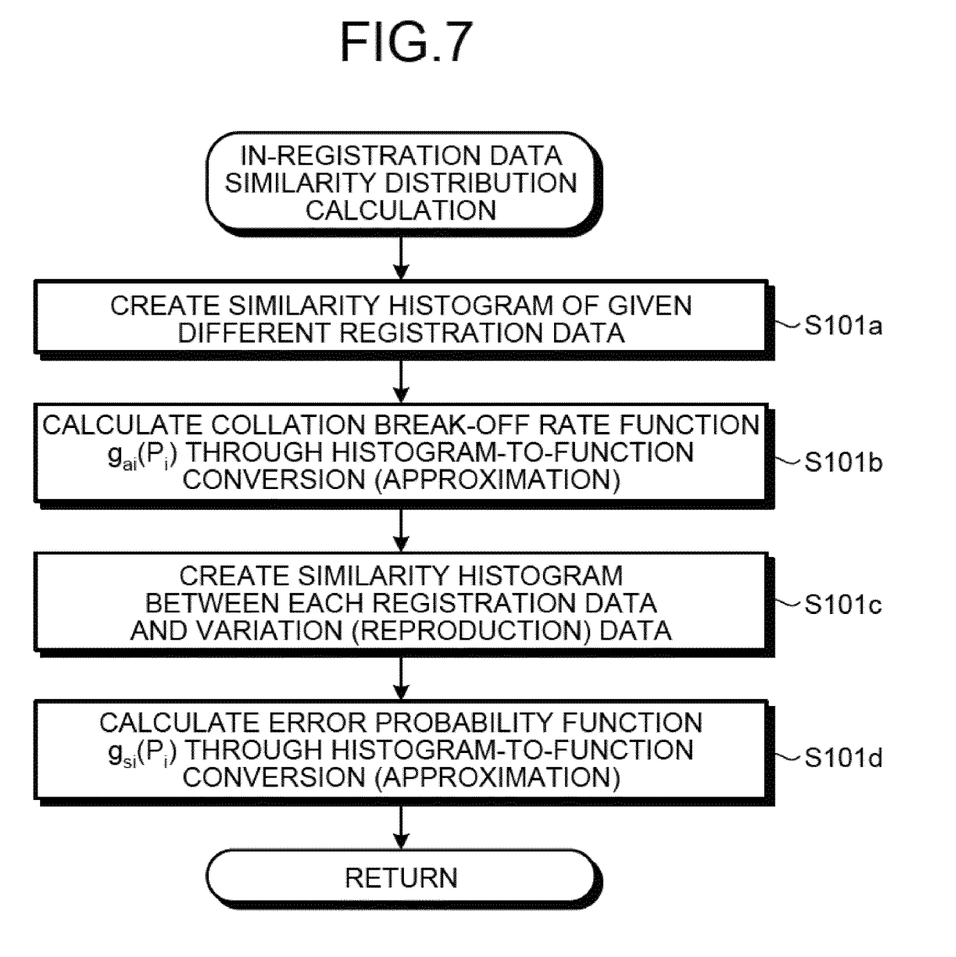
FIG. 7 is an example flowchart of in-registration data similarity distribution calculation illustrated in FIG. 6.

Next, the in-registration data similarity distribution calculation will be explained with reference to FIG. 7. First, the inter-different-data-similarity-variation-distribution calculator 103 creates a similarity histogram from given different pieces of registration data (step S101a). Then, the inter-different-data-similarity-variation-distribution calculator 103 performs an accumulation density conversion with respect to the similarity histogram of the different pieces of registration data to the upper side of the parameter P to calculate the collation break-off rate $g_{ai}(P)$ as an approximation function (step S101b).

Next, the identical-data-similarity-variation-distribution calculator 104 adds variation (reproduction) data which is reproduced by the on-entry variation reproducing unit 105 to each piece of registration data to create a similarity histogram of identical registration data (step S101c). Then, the identical-data-similarity-variation-distribution calculator 104 performs an accumulation density conversion with respect to the similarity histogram of the identical registration data to the lower side of the parameter P to calculate the error probability $g_{si}(P)$ as an approximation function (step S101d). When this processing ends, the identical-data-similarity-variation-distribution calculator 104 returns to step S102 in the optimum parameter group calculating processing.

A specific example of the optimum parameter group calculating processing will be explained below. The explanation below shows an example of minimizing the error probability under a constraint condition that the collation time is constrained within a predetermined time. Here, a performance in adjustment is compared between the conventional method and the method of the embodiment by using a typical and simple example in which an upper limit of the number of pieces of registration data is one thousand, the collation is performed at two stages, a unit collation time at the first stage "$C_1$" is 0.005, a unit collation time at the second stage "$C_2$" is 0.2, an error probability at the first stage is higher than an error probability at the second stage in the same break-off rate, and "$T_{const}$" is 10.0.

In general, a larger number of pieces of registration data take a longer collation time. In response, an adjustment is made with an assumption of a case where the number of pieces of registration data reaches the upper limit in the adjustment of surely satisfying the constraint on the total collation time. In the method of the embodiment, the parameter group on this occasion can be automatically and precisely obtained. In this case, the total collation time and the total error probability are represented as follows:

Total collation processing time:

$$T := N(C_1 + (1 - g_{a1}(P_1))C_2) = 1000 \times (0.005 + (1 - g_{a1}(P_1)) \times 0.2) \quad (3.1)$$

Total error probability:

$$G := 1 - (1 - g_{s1}(P))(1 - g_{s2}(P_2)) \quad (3.2)$$

In addition, the optimization problem is represented as follows.

$$\min_{\{P_i\}}(1 - (1 - g_{s1}(P_1))(1 - g_{s2}(P_2))) \qquad (4)$$

$$\text{s.t.} \quad 1000 \times (0.005 + (1 - g_{a1}(P_1)) \times 0.2) \le 10.0$$

At this time, though the optimization problem can be solved automatically via an existing calculation method, an example of a manual calculation of an optimum value will be first described below for a comparative explanation. When focusing attention on the collation break-off rate, since the error probability at the second stage is lower than the error probability at the first stage, the collation break-off rate at the first stage is low in the case of performing collation with the same number of pieces of registration data, and thereby the total error probability G becomes lower as the number of pieces of the registration data at the second stage increases. Therefore, the collation break-off rate at the first stage is preferably made as low as possible. However, there is an upper limit $g_{a1}(P_1)$ described below in the collation break-off rate at the first stage based on the above constraint equation. Accordingly, parameter groups $P_1$ and $P_2$ when expression (5) below has equality are optimum parameter groups when the number of pieces of registration data is maximum (one thousand).

$$g_{a1}(P_1) \ge 1.0 - \frac{(10.0/1000 - 0.005)}{0.2} = 0.975 \qquad (5)$$

The objective function in this case, i.e., the total error probability in expression (3.2) described above becomes about 0.04096 when "$g_{s1}(P_1)$=0.04" and "$g_{s2}(P_2)$=0.001" are true (though an explanation here is made by taking a typical value as an example, each value is, in practice, obtained from each error probability function created from registration data).

In the case of manually adjusting the parameter group, a method of assuming the worst case and setting and fixing the parameter group as described above as a result is adopted. However in this case, since the parameter group is fixed according to the upper limit of the number of pieces of the registration data, the total error probability is adapted to the case with the maximum registration data even when the number of pieces of the registration data is less than the upper limit. This is not necessarily most suitable in the case where the number of pieces of the registration data is less than the upper limit. For comparison, examples of an optimum parameter group and a total error probability obtained through the method of the embodiment when the number of pieces of the registration data is less than the upper limit will be described below.

For example, an example of calculating a parameter group in the case where the number of pieces of the registration data is three hundreds will be described below. In this case, an objective function and a constraint equation are established similarly to the case described above, and the objective function is minimized by a parameter group which realizes equality in expression (6) below based on the constraint equation.

$$g_{a1}(P_1) \ge 1.0 - \frac{(10.0/300 - 0.005)}{0.2} = 0.858333 \qquad (6)$$

The collation break-off rate at the first stage presented at a right-hand side of expression (6) above is lower than the collation break-off rate in the case where the number of pieces of the registration data is one thousand. It is guaranteed that the objective function in this case, i.e., the total error probability is lower than that in the case where the number of pieces of the registration data is one thousand because of monotonicity as a function of the collation break-off rate.

A degree of decrease of the total error probability depends on properties of a collation target and the registration data and often varies basically in an exponential manner with respect to parameters, and a variation of a degree of a few percentage of "$P_1$" often causes a variation in "$g_{s1}(P_1)$" substantially for more than several times, for example like "$g_{s1}(P_1)$=0.01".

On the other hand, since the collation break-off rate at the second stage as a final stage is not constrained (collation with remaining all pieces of data should be performed), "$g_{s2}(P_2)$" becomes 0.001 similarly to the case where the number of pieces of the registration data is one thousand. The objective function in this case, i.e., the total error probability becomes about 0.01099. This shows an improvement substantially equivalent to several times larger than the value of the objective function in the case where the number of pieces of the registration data is one thousand. In this manner, it is possible to perform high-reliability and high-performance data collation at a high collation speed within the desired designated value of the total collation time "$T_{const}$", by applying the parameter group automatically calculated in the method of the embodiment at each collation stage of the multistage collation apparatus.

When the constraint condition of the total error probability is used or when both of the total collation time constraint and the constraint condition of the total error probability are used, the collation time and the error probability can be optimized according to the number of pieces of the registration data and the property of the registration data by performing the same processing described above automatically.

While a specific embodiment has been described, other embodiments or modifications are also possible. In the following, such modifications are explained.

Of the processes described above, all or part of the processes described as being performed automatically may be performed manually, or all or part of the processes described as being performed manually may be performed automatically with a known method. The processing procedures, the control procedures, specific names, and information including various data and parameters described above and illustrated in the drawings may be arbitrarily changed as required unless otherwise specified.

The constituent elements described above are functionally conceptual, and need not be physically configured as illustrated. In other words, the specific mode of dispersion and integration of the constituent elements is not limited to the ones illustrated in the drawings, and the constituent elements, as a whole or in part, may be divided or integrated either functionally or physically based on various types of loads or use conditions.

All or any part of the processing functions performed by the devices may be realized by a microcomputer including a central processing unit (CPU), a micro processing unit (MPU), a micro controller unit (MCU), etc. and a program analyzed and executed by the microcomputer with the CPU, MPU, MCU, or the like, or may be realized as hardware by wired logic.

As set forth hereinabove, according to an embodiment, optimum parameters are automatically obtained according to the status of registration data and collation is performed based on the optimum parameters. Thus, compared to the case of using parameters manually and fixedly set in advance, it is possible to achieve high-precision and high-speed collation.

Moreover, parameter optimization which has to be manually performed in advance by trial and error can be automatically performed. This enables the reduction of operating cost and the like in readjustment of optimum parameters.

Furthermore, in contrast to conventionally-used manually-set parameters, which are adopted based on an experience and of no guarantee in optimality, high-precision and high-speed collation can be performed by using optimum parameters whose optimality is logically guaranteed with high reliability.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A parameter controlling apparatus that controls parameters for adjusting, in a multistage collation apparatus that collates between input data and multiple pieces of registration data at multiple stages with multiple collating devices, refinement precision of the registration data, the parameter controlling apparatus comprising:
    an inter-different-data-similarity-variation-distribution calculator that calculates distribution of similarity variation of different pieces of data as distribution of occurrence probability of similarity of different pieces of the registration data in the collating devices at multiple stages;
    an identical-data-similarity-variation-distribution calculator that calculates distribution of similarity variation in identical data as distribution of occurrence probability of similarity in identical data for each of the input data;
    a collation break-off rate function creator that creates a collation break-off rate function in which the parameters are variables in the collating devices at multiple stages based on the distribution of similarity variation of the different pieces of data calculated by the inter-different-data-similarity-variation-distribution calculator;
    an error probability function creator that creates an error probability function in which the parameters are variables in the collating devices at multiple stages based on the distribution of similarity variation in the identical data calculated by the identical-data-similarity-variation-distribution calculator;
    a total collation time function and total error probability function creator that creates a total collation time function and a total error probability function based on the collation break-off rate function, the error probability function, number of pieces of the registration data, and unit collation time information in the collating devices at multiple stages;
    a constraint equation creator that creates a constraint equation based on the total collation time function, the total error probability function, total collation time constraint parameters corresponding to the total collation time function, and total error probability constraint parameters corresponding to the total error probability function; and
    an optimum parameter calculator that calculates an optimum parameter group which is a combination of parameters that optimizes an objective function constituted by the collation break-off rate function, the error probability function, the total collation time function, and the total error probability function among combinations of parameters that satisfy the constraint equation created by the constraint equation creator.

2. The parameter controlling apparatus according to claim 1, wherein the inter-different-data-similarity-variation-distribution calculator calculates the distribution of similarity variation of the different pieces of data including registration data of a same kind registered in other systems.

3. The parameter controlling apparatus according to claim 1, wherein at least one of the inter-different-data-similarity-variation-distribution calculator and the identical-data-similarity-variation-distribution calculator calculates at least one of the distribution of similarity variation of the different pieces of data and the distribution of similarity variation in the identical data by estimating variation upon entry of the registration data.

4. The parameter controlling apparatus according to claim 1, further comprising a constraint parameter calculator that calculates one of the total collation time constraint parameters and the total error probability constraint parameters in which the combinations of the parameters that satisfy the constraint equation are present, wherein
    the constraint equation is constituted by at least one of a first relational expression between the total collation time function and the total collation time constraint parameters, and a second relational expression between the total error probability function and the total error probability constraint parameters, and
    the optimum parameter calculator calculates the optimum parameter group which optimizes the total collation time constraint parameters and the total error probability constraint parameters calculated by the constraint parameter calculator, and the objective function constituted by the collation break-off rate function, the error probability function, the total collation time function, and the total error probability function upon applying the total collation time constraint parameters and the error probability constraint parameters.

5. The parameter controlling apparatus according to claim 4, wherein
    when the optimum parameter calculator cannot obtain the optimum parameter group, the constraint parameter calculator relaxes at least one of the total collation time constraint parameters and the total error probability constraint parameters, and
    the optimum parameter calculator reapplies at least one of the total collation time constraint parameters and the total error probability constraint parameters relaxed by the constraint parameter calculator, and calculates the optimum parameter group that optimizes the objective function constituted by the collation break-off rate function, the error probability function, the total collation time function, and the total error probability function.

6. A computer readable storage medium containing instructions that, when executed by a computer, causes the computer to control parameters in a multistage collation apparatus that collates between input data and multiple pieces of registration data at multiple stages with multiple collating devices, the instructions causing the computer to perform:

first calculating distribution of similarity variation of different pieces of data as distribution of an occurrence probability of similarity of different pieces of the registration data in the collating devices at multiple stages;

second calculating distribution of similarity variation in identical data as distribution of occurrence probability of similarity in identical data for each of the input data;

creating a collation break-off rate function in which the parameters are variables in the collating devices at multiple stages based on the distribution of similarity variation of the different pieces of data;

creating an error probability function in which the parameters are variables in the collating devices at multiple stages based on the distribution of similarity variation in the identical data;

creating a total collation time function and a total error probability function based on the collation break-off rate function, the error probability function, number of pieces of the registration data, and unit collation time information in the collating devices at multiple stages;

creating a constraint equation based on the total collation time function, the total error probability function, total collation time constraint parameters corresponding to the total collation time function, and total error probability constraint parameters corresponding to the total error probability function; and third calculating an optimum parameter group which is a combination of parameters that optimizes an objective function constituted by the collation break-off rate function, the error probability function, the total collation time function, and the total error probability function among combinations of parameters that satisfy the constraint equation created.

7. The computer readable storage medium according to claim 6, wherein the first calculating includes calculating the distribution of similarity variation of the different pieces of data including registration data of a same kind registered in other systems.

8. The computer readable storage medium according to claim 6, wherein at least one of the distribution of similarity variation of the different pieces of data and the distribution of similarity variation in the identical data is calculated by estimating variation upon entry of the registration data.

9. The computer readable storage medium according to claim 6, the instructions further causing the computer to perform fourth calculating one of the total collation time constraint parameters and the total error probability constraint parameters in which the combinations of the parameters that satisfy the constraint equation are present, wherein the constraint equation is constituted by at least one of a first relational expression between the total collation time function and the total collation time constraint parameters, and a second relational expression between the total error probability function and the total error probability constraint parameters, and the third calculating includes calculating the optimum parameter group which optimizes the total collation time constraint parameters and the total error probability constraint parameters calculated at the fourth calculating, and the objective function constituted by the collation break-off rate function, the error probability function, the total collation time function, and the total error probability function upon applying the total collation time constraint parameters and the error probability constraint parameters.

10. The computer readable storage medium according to claim 9, wherein when the optimum parameter group cannot be obtained at the third calculating, at least one of the total collation time constraint parameters and the total error probability constraint parameters are relaxed at the fourth calculating, and the third calculating includes reapplying at least one of the total collation time constraint parameters and the total error probability constraint parameters relaxed at the fourth calculating, and calculating the optimum parameter group that optimizes the objective function.

11. A multistage collation apparatus that controls parameters for collating between input data and multiple pieces of registration data at multiple stages with multiple collating devices, the multistage collation apparatus comprising:

an inter-different-data-similarity-variation-distribution calculator that calculates distribution of similarity variation of different pieces of data as distribution of occurrence probability of similarity of different pieces of the registration data in the collating devices at multiple stages;

an identical-data-similarity-variation-distribution calculator that calculates distribution of similarity variation in identical data as distribution of occurrence probability of similarity in identical data for each of the input data;

a collation break-off rate function creator that creates a collation break-off rate function in which the parameters are variables in the collating devices at multiple stages based on the distribution of similarity variation of the different pieces of data calculated by the inter-different-data-similarity-variation-distribution calculator;

an error probability function creator that creates an error probability function in which the parameters are variables in the collating devices at multiple stages based on the distribution of similarity variation in the identical data calculated by the identical-data-similarity-variation-distribution calculator;

a total collation time function and total error probability function creator that creates a total collation time function and a total error probability function based on the collation break-off rate function, the error probability function, number of pieces of the registration data, and unit collation time information in the collating devices at multiple stages;

a constraint equation creator that creates a constraint equation based on the total collation time function, the total error probability function, total collation time constraint parameters corresponding to the total collation time function, and total error probability constraint parameters corresponding to the total error probability function; and an optimum parameter calculator that calculates an optimum parameter group which is a combination of parameters that optimizes an objective function constituted by the collation break-off rate function, the error probability function, the total collation time function, and the total error probability function among combinations of parameters that satisfy the constraint equation created by the constraint equation creator.

12. The multistage collation apparatus according to claim 11, wherein the inter-different-data-similarity-variation-distribution calculator calculates the distribution of similarity variation of the different pieces of data including registration data of a same kind registered in other systems.

13. The multistage collation apparatus according to claim 11, wherein at least one of the inter-different-data-similarity-variation-distribution calculator and the identical-data-similarity-variation-distribution calculator calculates at least one of the distribution of similarity variation of the different pieces of data and the distribution of similarity variation in the identical data by estimating variation upon entry of the registration data.

14. The multistage collation apparatus according to claim 11, further comprising a constraint parameter calculator that calculates one of the total collation time constraint parameters and the total error probability constraint parameters in which the combinations of the parameters that satisfy the constraint equation are present, wherein
the constraint equation is constituted by at least one of a first relational expression between the total collation time function and the total collation time constraint parameters, and a second relational expression between the total error probability function and the total error probability constraint parameters, and
the optimum parameter calculator calculates the optimum parameter group which optimizes the total collation time constraint parameters and the total error probability constraint parameters calculated by the constraint parameter calculator, and the objective function constituted by the collation break-off rate function, the error probability function, the total collation time function, and the total error probability function upon applying the total collation time constraint parameters and the error probability constraint parameters.

15. The multistage collation apparatus according to claim 14, wherein
when the optimum parameter calculator cannot obtain the optimum parameter group, the constraint parameter calculator relaxes at least one of the total collation time constraint parameters and the total error probability constraint parameters, and
the optimum parameter calculator reapplies at least one of the total collation time constraint parameters and the total error probability constraint parameters relaxed by the constraint parameter calculator, and calculates the optimum parameter group that optimizes the objective function constituted by the collation break-off rate function, the error probability function, the total collation time function, and the total error probability function.

* * * * *